SINGLE SIDEBAND RECEPTION

Filed Oct. 22, 1957 2 Sheets-Sheet 1

Inventor
IRVING A. KRAUSE
By Percy P. Lantzy
Attorney

Inventor
IRVING A. KRAUSE
By [signature]
Attorney

United States Patent Office 2,999,154
Patented Sept. 5, 1961

2,999,154
SINGLE SIDEBAND RECEPTION
Irving A. Krause, Nutley, N.J., assignor to International Telephone and Telegraph Corporation, Nutley, N.J., a corporation of Maryland
Filed Oct. 22, 1957, Ser. No. 691,683
1 Claim. (Cl. 250—20)

This invention relates to modulated carrier wave communication systems, and more especially it relates to carrier transmission and reception systems of the single sideband.

A principal object of the invention is to provide an improved method and apparatus for transmitting and receiving communications by single sideband operation.

Another principal object is to provide a novel carrier insertion arrangement for receiving signal-modulated carrier where the carrier per se is entirely suppressed, or if not suppressed, is of such low level at the point of reception with respect to the useful level of the signal modulations as to be unreliable in controlling the frequency of a local insertion oscillator at the receiver.

A feature of the invention relates to a suppressed carrier communication system, for example, a single sideband system, wherein a characteristic fundamental frequency of the original signals to be transmitted and received is used as a reference standard to control the frequency of a local insertion oscillator of the usual single sideband receiver.

Another feature relates to a suppressed carrier, single sideband transmission system wherein a portion of the received sideband spectrum is subjected to a non-linear detection to derive a control signal which represents the constant fundamental frequency of the signal modulations as transmitted and the said control signal is then mixed with the single sideband spectrum prior to such detection, so as to obtain a constant carrier frequency which can be used as the local insertion oscillation source, or frequency control therefor, of any well-known single sideband receiver.

A further feature relates to a novel method and apparatus for producing from received carrier-suppressed signals, a local insertion source of carrier of the proper assigned frequency for proper signal demodulation.

A further feature relates to a novel method and apparatus for determining the carrier frequency required to demodulate the signal modulations in a suppressed carrier single sideband receiving system.

A still further feature relates to the novel organization, arrangement, and relative location and interconnection of elements, which by their conjoint and mutual operation, provide an improved system for checking the carrier frequency or for producing the carrier frequency necessary for receiving single sideband suppressed carrier signals.

Further features and advantages not particularly enumerated will appear from the following descriptions, the appended claim, and from the attached drawings, wherein:

Figure 1:
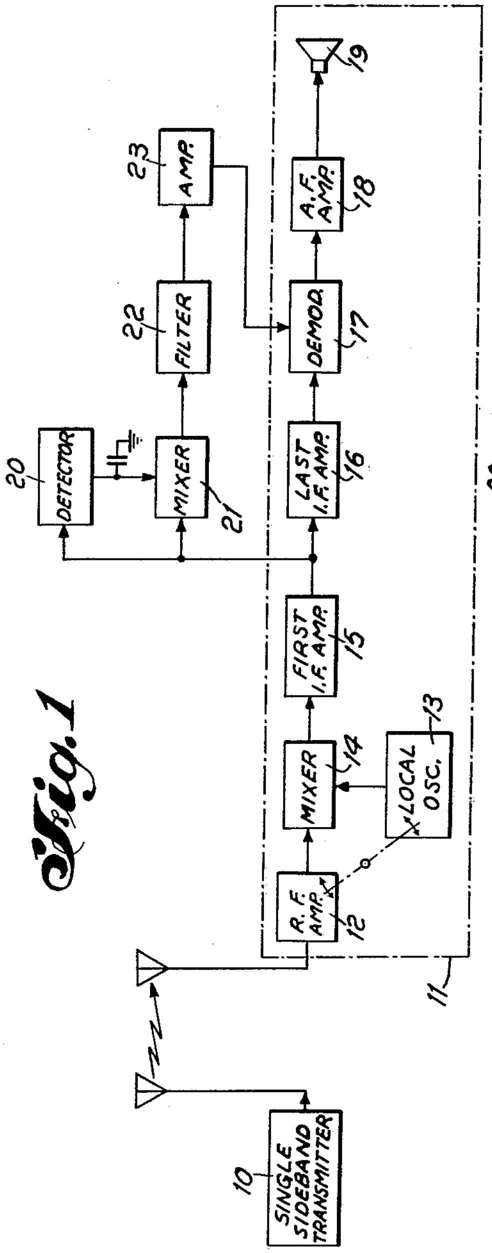
FIG. 1 is a schematic block diagram of a single sideband carrier system employing the novel receiving arrangement according to the invention.

As is well known, carrier communication by the single sideband method can be effected either by transmitting the carrier and one modulation sideband, or by suppressing the carrier and transmitting only the sideband modulations. Since one of the advantages in single sideband transmission is the improvement in signal-to-noise ratio, by reason of the relative concentration of the power in the sideband as compared with that in the carrier per se; even when a residual carrier is transmitted, its power may be insufficient to provide a reliable control of the carrier demodulation at the receiver. In other words, the carrier may be lost in the noise level, so that ordinary automatic carrief frequency control for the insertion oscillator at the receiver may fail. If, on the other hand, a large amount of pilot carrier is employed at the transmitter, then the advantage of single sideband is to a great extent lost.

In the carrier-suppressed single sideband receiver it is necessary, in order to derive the demodulated signals with satisfactory intelligibility and readability, to insert at the receiver a demodulation carrier of the same frequency or of a precisely related frequency to that which is used for modulation at the transmitter. While methods of generating local insertion demodulation carriers at the receiving end are well known, there has arisen a need for the generation of such a carrier in a carrier-suppression system, the frequency of which insertion carrier is controlled by the received modulations as distinguished from control by a local and separate frequency reference standard, such as a precision oscillator and the like.

In accordance with the present invention, a characteristic fundamental frequency of the detected audio frequency signals is used, by interaction with the received single sideband carrier modulations prior to such detection, to produce a carrier which can be used directly as the local insertion oscillator in a demodulation stage of a conventional single sideband receiver; or it can be used to produce an automatic frequency control for a separate oscillation generator which provides the demodulating carrier at the receiver.

Since each speech signal is a complex wave, it always consists of a fundamental frequency and harmonics of that frequency. In other words, the difference between any two adjacent harmonics is the same as the fundamental frequency itself. During speech, the fundamental varies or moves around, but whatever frequency the fundamental assumes, the above-noted difference relation between adjacent harmonics is always equal to the fundamental. For example, in the case of the average male voice the fundamental may be 200 cycles per second with adjacent harmonics also differing by 200 cycles per second. We assume, for purpose of illustration, that 200 c.p.s. is the lowest intelligence frequency to be transmitted and can be more or less as the case may be. Since the reecived single sideband signal consists of the original audio frequency modulations displaced from an audio frequency range to the radio frequency range, or to the intermediate frequency range in the case of a superheterodyne receiver, the adjacent radio frequency or intermediate frequency components will still be separated from each other by the original fundamental frequency of the speech signals, for example, 200 cycles per second. Thus if the speech modulated single sideband signal is passed through a detector or other well-known non-linear device, the output thereof will contain sum and difference products in the radio frequency or intermediate frequency ranges. The sum products may be discarded or filtered, out, but the difference products will contain the fundamental audio component amongst other frequency products. If this detected fundamental is heterodyned against the single sideband signal as it exists prior to such detection, there will be produced amongst the cross products a frequency which is identical to the suppressed carrier or which has a frequency having a fixed numerical relation to the frequency of the suppressed carrier, in the case of intermediate frequency stages. This particular cross product may then be used as the carrier insertion oscillation source of any of the stages of a conventional single sideband receiver. The same technique may also be used to control the frequency of the local oscillator of the single sideband receiver such that a fixed demodulation oscillator properly placed with respect to the pass band of the receiver will properly demodulate the signal automatically.

As one particular illustration, let it be assumed that the speech signal at any given instant consists of the fundamental 200 c.p.s. and 400 c.p.s., which signal is being transmitted on a 500,000 c.p.s. carrier. If the lower sideband is discarded and only the upper sideband used, the latter will then be a signal consisting of 500,200 c.p.s. and 500,400 c.p.s. After passing the selected upper sideband through a suitable non-linear network or detector, there is produced in the output of the detector a difference beat frequency of 500,400 minus 500,200 c.p.s. or 200 c.p.s., which is the fundamental frequency of the audio frequency signal. If this fundamental frequency is heterodyned against the original 500,200 and 500,400 c.p.s. signal, there are produced two components, namely, $500,200\pm200$ and $500,400\pm200$. In that case the difference product 500,200 minus 200 is 500,000 c.p.s., which is the frequency of the missing carrier.

Referring to FIG. 1, there is shown one typical single sideband system embodying the invention. In this figure the block 10 represents any well-knon single sideband radio transmitter, the carrier frequency of which may be any RF frequency. In such a system the single sideband, for example, the upper sideband transmission, is received in any well-known single sideband radio receiver indicated by the block 11 which is preferably, although not necessarily, of the superheterodyne kind. This receiver may include, for example, a radio frequency amplifier 12, a local frequency conversion oscillator 13, and a mixer 14 for converting the received single sideband signal to a lower or intermediate frequency range, as is well known in the superheterodyne receiver art. This intermediate frequency single sideband is amplified in a suitable intermediate frequency amplifier 15. If desired, one or more additional intermediate frequency amplifier stages may be used. The last intermediate frequency amplifier stage 16 is connected to a demodulator 17 of any well-known kind, which is also supplied with a demodulation or insertion carrier of the desired frequency which, of course, must bear a fixed relation to the suppressed carrier in the received single sideband transmission. The output of demodulator 17 is then amplified in any suitable audio frequency amplifier 18 whose output is applied to any suitable transducer or louspeaker 19.

In accordance with the invention, the insertion frequency for supplying the demodulating carrier to the demodulator 17 is derived under control of the received single sideband signal itself, even though that signal may have the carrier suppressed or of insufficient level to be used as a reliable source of insertion frequency for detector 18. Merely for purposes of illustration, let it be assumed that the superheterodyne receiver is arranged to produce at the output of the mixer 14 an intermediate frequency of 500,000 c.p.s. and that the audio frequency modulation signal has a fundamental frequency of 200 c.p.s. with, for example, a first harmonic of 400 c.p.s., and let it be assumed that the amplifier 15 is arranged to pass only the upper sideband. The output of amplifier 15 will then consist of 500 kc. plus 200 c.p.s. and 500 kc. plus 400 c.p.s. Then a portion of the output of amplifier 15 is also applied to a non-linear detector 20 which produces at its output, amongst other frequencies, the fundamental frequency of 200 c.p.s. By a suitable filter arrangement only this 200 c.p.s. fundamental frequency is applied to a mixer network or device 21. There is also fed to the mixer device 21 a portion of the output of the amplifier 15. The output of the mixer 21 is then passed through a filter 22, which passes only the difference frequency between the single sideband IF carrier applied to mixer 21 and the 200 c.p.s. signal applied to the mixer from detector 20. This difference frequency at the output of filter 22 will then be 500 kc. Preferably the filter 22 is a narrow band filter which has the lower limit of the pass band greater than the carrier minus 200 c.p.s., and the upper limit of the pass band less than the carrier plus 200 c.p.s., the pass band being less than 400 c.p.s. as a result of which the 500 kc. at the output of the filter 22 is the desired carrier devoid of spurious components.

It will be understood, of course, that the center frequency of the filter 22 should be located at either edge of the pass band of the intermediate frequency depending upon whether upper or lower sideband is being received from the transmitter 10. Since the spurious components from the mixer 21 are displaced from the carrier by the audio frequency fundamental, the 200 c.p.s. pass band width of filter 22 will be adequate for normal voice transmissions, for example, the male voice. It will also be understood that the invention is not limited to any particular fundamental voice frequency. The desired 500 kc. carrier is then amplified in a suitable amplifier 23, the output of which can be used as the local insertion oscillator for the demodulator 17, thus allowing it to demodulate the single sideband signal from the last intermediate frequency stage 16.

While in the foregoing there has been described a system wherein the carrier from the mixer 21 is used directly as the insertion demodulating carrier for the demodulator 17, under certain circumstances it may be desirable to use a separately excited oscillator for the demodulating insertion carrier and to cause the said oscillator to generate a demodulating carrier which bears a fixed relation to the frequency of the deleted carrier which gives rise to the single sideband signals. Such an arrangement is schematically illustrated in FIG. 2 of the drawings wherein the various parts which are the same as those of FIG. 1 bear the corresponding designation numerals.

Figure 2:
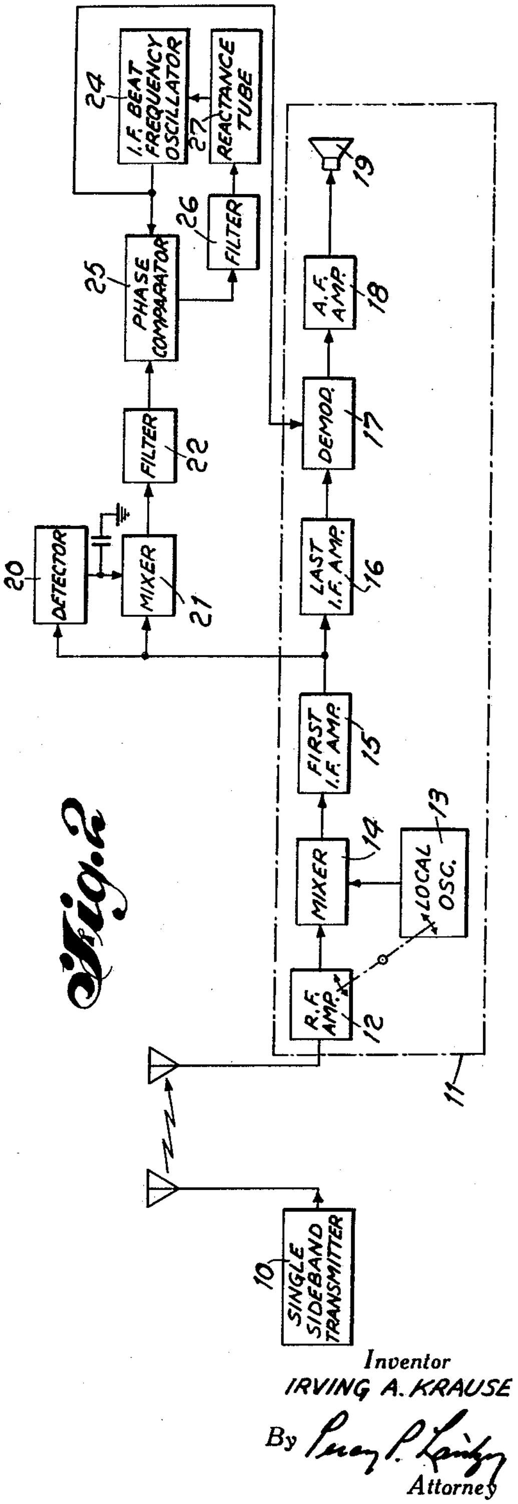
FIG. 2 is a schematic block diagram of a modification of FIG. 1.

In FIG. 2 there is provided a separately excited beat frequency oscillator 24 designed to generate an intermediate frequency carrier of the proper carrier frequency to demodulate the intermediate frequency signals in the demodulator 17. For that purpose a part of the output of oscillator 24 is fed to any well-known phase comparison network 25 which is also fed from the output of filter 22. As pointed out in connection with FIG. 1, the output of mixer 21 produces the desired carrier, for example, 500 kc. with spurious signal frequencies and the filter 22 passes only the 500 kc. carrier. This output is compared in phase with a portion of the carrier output from oscillator 24 to produce in the output of device 25 a direct current voltage with spurious components above 200 c.p.s. These spurious components are removed by a suitable filter 26, and the direct current control voltage from filter 26 is then applied to any well-known automatic tuning control device 27 associated with the frequency determining circuit of oscillator 24 to maintain the latter generating the exact IF carrier frequency, which bears a fixed relation to the suppressed carrier in the received single sideband signals. For example, the device 27 may take the form of any well-known variable reactance tube whose reactance can be varied in accordance with the direct current voltage from filter 26. The controlled output of the oscillator 24 can then be connected to the demodulator 17 to provide the proper demodulating carrier therefor, so as to demodulate the single sideband audio frequency signals.

Thus far the receiver system as disclosed in FIGS. 1 and 2 has automatically produced the proper insertion carrier frequency for demodulation of the single sideband signal. At high radio frequencies where oscillator drift in both the transmitter and receiver becomes a limiting factor, the single sideband is seldom, if ever, used without some pilot tone or carrier frequency being retained. As previously explained, the pilot carrier detracts from the advantages of the single sideband suppressed carrier system.

Figure 3:
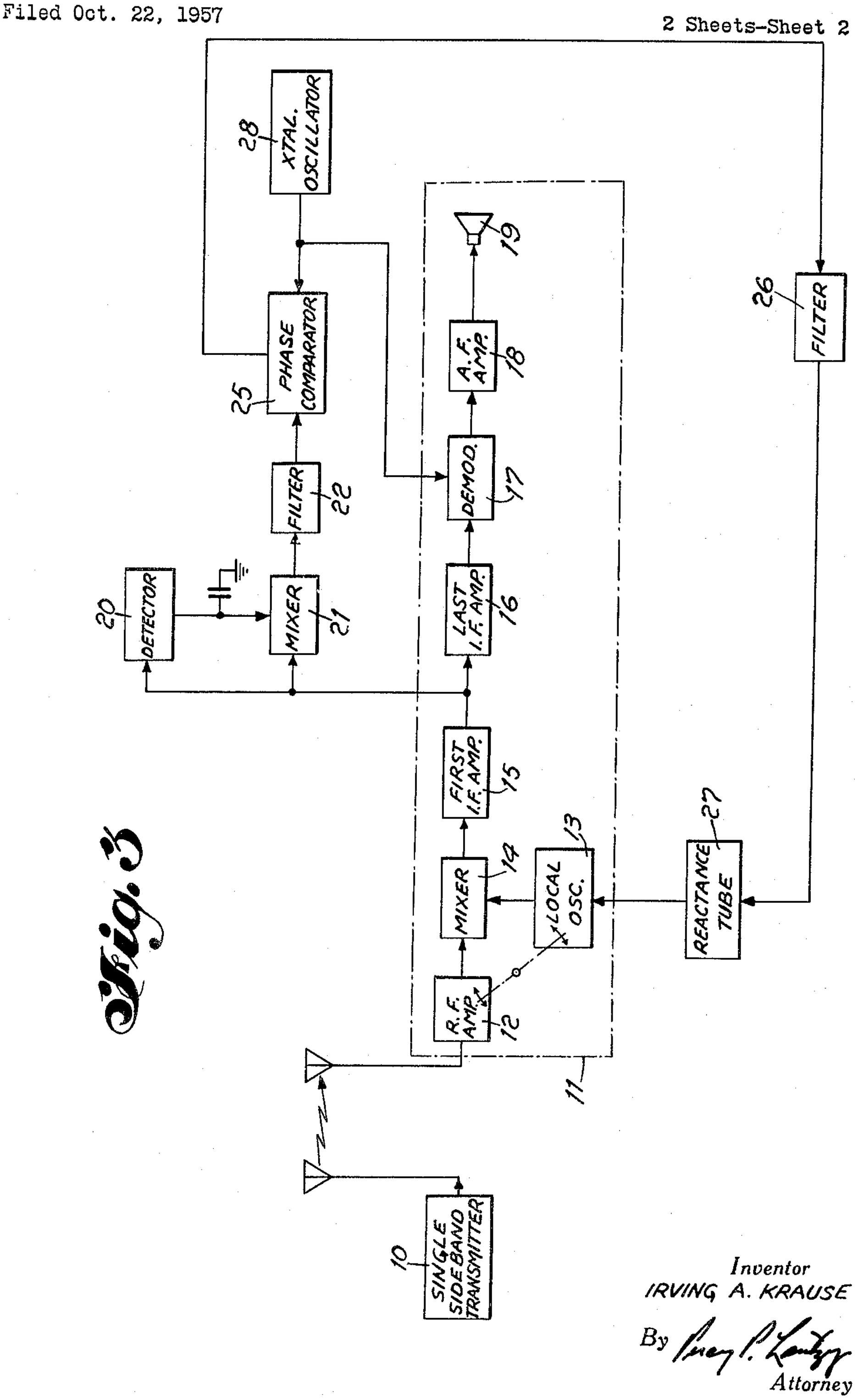
FIG. 3 is a schematic block diagram of another modification of FIG. 1.

A third embodiment shown in FIG. 3 uses the same techniques for generating the IF carrier, but instead of controlling the local demodulating oscillator with the error voltage, the local oscillator of the receiver is controlled. In this way the IF signal remains in fixed frequency relative to the fixed IF demodulating oscillator. Thus transmitter and receiver frequency drifts are canceled. The output of a crystal oscillator 28 generating the correct insertion carrier frequency is coupled to the phase comparator 25, where it is compared in phase with the output of filter 22 to produce in the output of the phase comparator 25 a direct current voltage with spurious components above 200 c.p.s. These spurious components are removed by filter 26, and the filtered direct current control voltage is applied to the reactance tube 27 associated with the oscillator 13 to automatically tune the local oscillator 13 to the correct conversion frequency.

In all of the foregoing it has been assumed, for illustrative purposes only, that the upper sideband is the only single sideband utilized. It is obvious that in this system either the upper or the lower sidebands may be used and the usual techniques, well-known to those skilled in the art, can be employed to switch from one sideband to the other as the reception of the signal may require. Among the possible methods of sideband switching that may be employed are two IF channels, one for the upper sideband and the other for the lower sideband. In this case the carrier does not have to move. Another method is the use of two insertion carrier frequencies in the crystal oscillator of FIG. 3. In this case the local oscillator must be returned to move the single sideband signal received to the IF pass band. Still a third method is to change the tuning of the local oscillator so that the upper and lower sidebands are interchanged.

It is to be understood that this invention is not limited to voice transmission but may be used wherever there is complex periodic wave transmission, such as in facsimile, sideband television, etc.

While various frequency values have been referred to herein, it will be understood that the same has been done merely for the purpose of explanation and not by way of limitation thereto, the essential feature being that in all disclosed embodiments the audio frequency signals can be detected and reproduced from the received suppressed carrier single sideband transmission by using a characteristic fundamental frequency of the said audio frequency signals to provide or control the demodulation insertion oscillator for the detection portion of the receiver.

While I have described above the principles of my invention in connection with specific apparatus, it is to be clearly understood that this description is made only by way of example and not as a limitation on the scope of my invention as set forth in the objects thereof and in the accompanying claim.

I claim:

In a single sideband radio receiving system, the combination of a single sideband radio receiver including means to receive a single sideband suppressed carrier signal, a local oscillator, means to mix said single sideband suppressed carrier signal with the output of said local oscillator to derive a single sideband suppressed carrier intermediate frequency signal, means to detect from said intermediate frequency signal a characteristic fundamental frequency of the signal modulation, mixer means to combine said detected fundamental frequency with the single sideband intermediate frequency signal to produce a series of cross products, filter means to derive from said cross products an intermediate frequency carrier signal, a crystal oscillator for generating a fixed intermediate frequency demodulating signal, means to compare the phase of said fixed demodulating signal with the signal output of said filter means to produce a control voltage, means to apply said control voltage to said local oscillator to cause said local oscillator to generate a correct signal frequency which when mixed with the said single sideband suppressed carrier signal will result in said single sideband suppressed carrier intermediate frequency signal having a carrier frequency which bears a fixed frequency relation to said demodulating signal, and demodulating means to derive from said demodulating signal and the single sideband suppressed carrier intermediate frequency signal the signal modulation of said single sideband suppressed carrier signal.

References Cited in the file of this patent

UNITED STATES PATENTS

| | | |
|---|---|---|
| 2,193,801 | Byrne | Mar. 19, 1940 |
| 2,593,266 | Chauveau | Apr. 15, 1952 |
| 2,623,169 | Gardere | Dec. 23, 1952 |
| 2,836,712 | Crosby | May 27, 1958 |